(No Model.)

E. O. ROBINSON.
ASH PIT.

No. 307,337. Patented Oct. 28, 1884.

Witnesses:
H. L. Castle
C. Hasbrouck

Inventor,
Ernest O. Robinson
by atty. H. O. Potter

UNITED STATES PATENT OFFICE.

ERNEST O. ROBINSON, OF PITTSBURG, PENNSYLVANIA.

ASH-PIT.

SPECIFICATION forming part of Letters Patent No. 307,337, dated October 28, 1884.

Application filed November 12, 1883. (No model.)

*To all whom it may concern:*

Be it known that I, ERNEST O. ROBINSON, of Pittsburg, county of Allegheny, State of Pennsylvania, have invented or discovered a new and useful Improvement in Ash-Pits; and I do hereby declare the following to be a full, clear, concise, and exact description thereof, reference being had to the accompanying drawings, making a part of this specification, in which—like letters indicating like parts—

Figure 1:
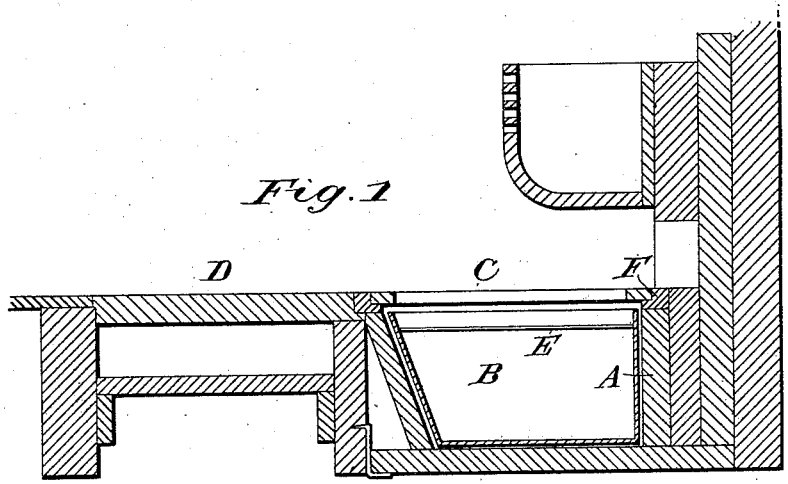
Figure 2:
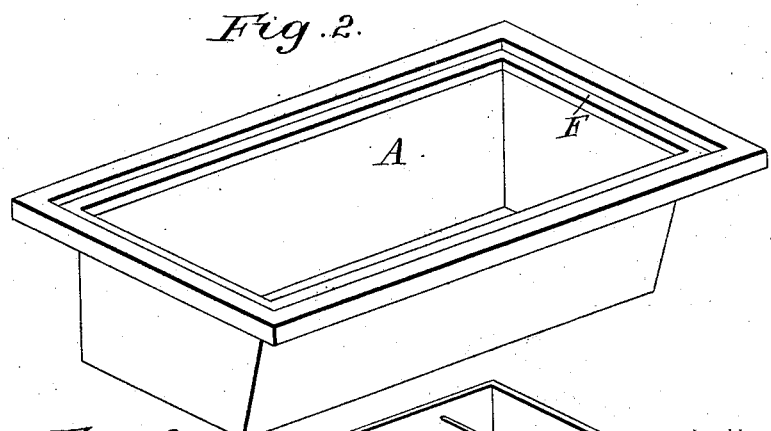
Figure 3:
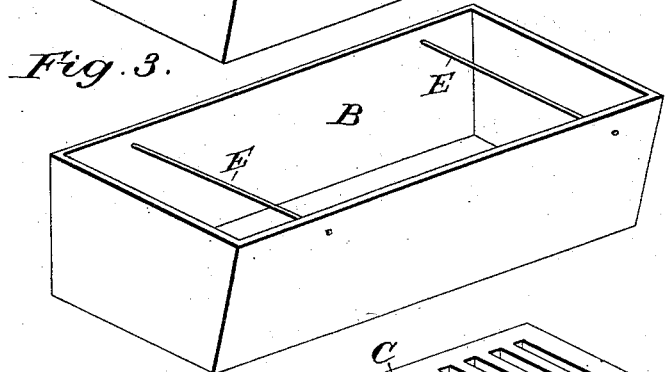
Figure 4:
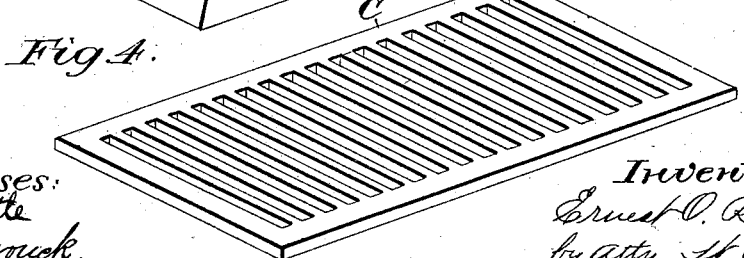

Figure 1 is a sectional view of a fire-place embodying my invention; Fig. 2, a detail view in perspective of the ash-pit; Fig. 3, a similar view of the ash pan or box, and Fig. 4 a detail view in perspective of the grate to place over the ash-pit.

The present invention has relation to certain new and useful improvements in ash-pits and ash-pans therefor; and it consists in the details of construction, substantially as shown in the drawings, and hereinafter described and claimed.

In the accompanying drawings, A represents the ash-pit, situated immediately below and directly under and a suitable distance in front of the fire-grate of an ordinary fire-place.

Within the ash-pit A is located the removable ash-pan B, a suitable grate, C, covering the ash-pit, and resting on shoulder F, extending around the four sides thereof, the ashes falling through said grating into the pan B. A hearth-stone, D, is provided, located upon a foundation of brick and cement directly in front of the ash-pit, and supported by planks resting upon cleats nailed to the joists supporting the floor.

The ash-pit A may be of any suitable size and shape, and the pan B in form to correspond therewith, the ash-pit at its bottom being supported by the joists in any suitable manner, as by tile or brick and cement.

In place of providing handles or bails extending outwardly from the sides of the ash-pan, I provide it with transverse rods E, extending across the interior of the pan and secured to the sides thereof, thereby enabling the pan to closely fit within the ash-pit without leaving any space between the sides of the ash pit and pan for the lodgment of the ashes.

It is essential that some means should be provided for conveniently removing the ash-pan when full, and also replacing it after being emptied of its contents, and therefore the transverse rods E are employed to serve as handles, and their peculiar location removes all necessity of having the usual handles extending laterally or upwardly from the sides of the pan. It is obvious that if they were so arranged in the former case a wide space would be left between the sides of the ash pit and pan equal to the extent to which the handles projected, and thus a smaller pan or larger pit would have to be used than otherwise were handles not connected to the side, and in any event the space between the pit and pan would become filled and clogged with ashes, making it difficult to remove the pan when full. In case the handles projected upwardly they would be in the way of the grate C without it was located sufficiently high above the pan, which would be impracticable, as taking up an unnecessary amount of space. The rods E not only form handles, but act as stays for the sides of the ash-pan, thereby materially increasing its strength and durability.

Having now fully described my invention, what I claim as new, and desire to secure by Letters Patent, is—

The combination, with a suitable ash-pit and removable grating located over the same, of an ash-pan of size and form to correspond with that of the ash-pit, and provided with transverse rods extending across the interior thereof and secured to its side, which serve both as handles and stays for the pan, substantially as and for the purpose set forth.

In testimony whereof I have hereunto set my hand.

ERNEST O. ROBINSON.

Witnesses:
S. HENRY THOMPSON,
R. C. DUNCAN.